Figure 1:
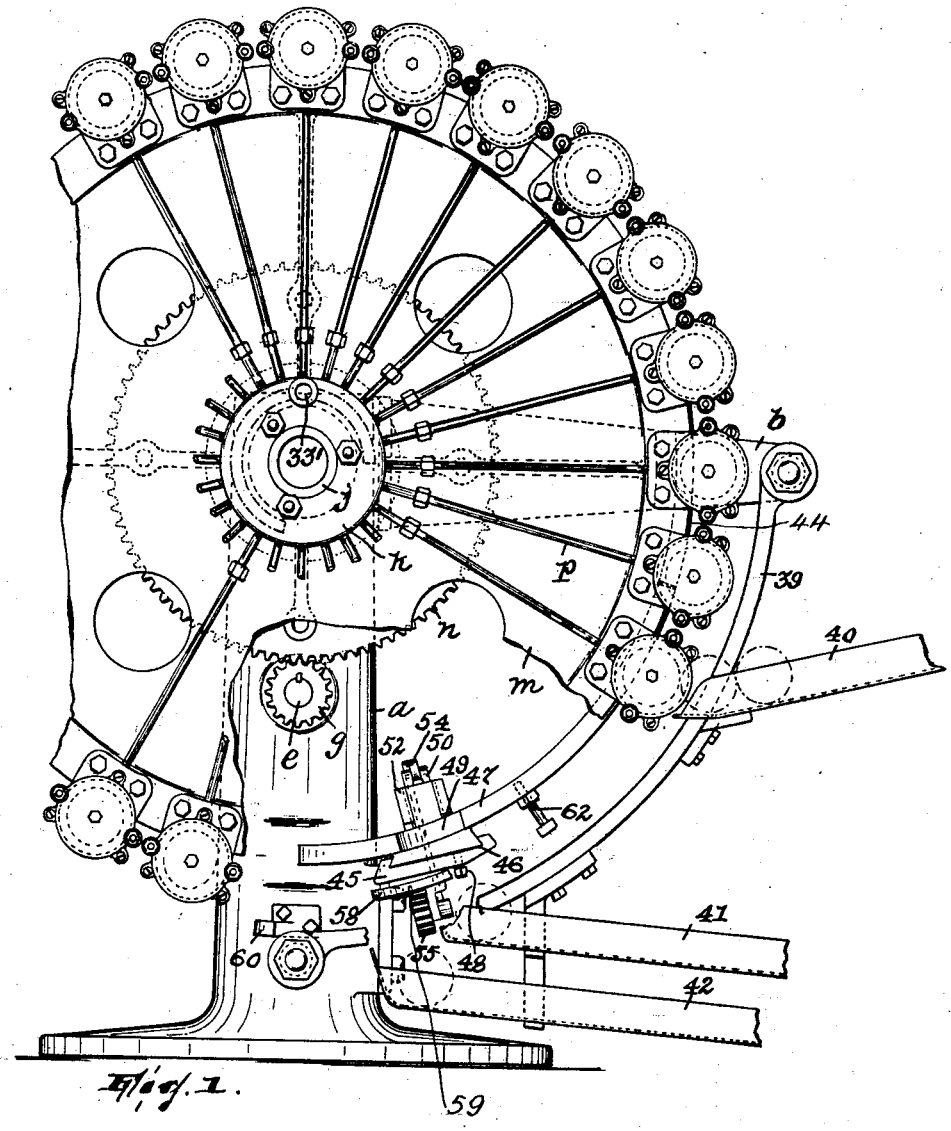

No. 762,604. PATENTED JUNE 14, 1904.
B. ADRIANCE & A. CALLESON.
CAN TESTING MACHINE.
APPLICATION FILED AUG. 10, 1903.
NO MODEL. 4 SHEETS—SHEET 1.

No. 762,604. PATENTED JUNE 14, 1904.
B. ADRIANCE & A. CALLESON.
CAN TESTING MACHINE.
APPLICATION FILED AUG. 10, 1903.
NO MODEL. 4 SHEETS—SHEET 2.
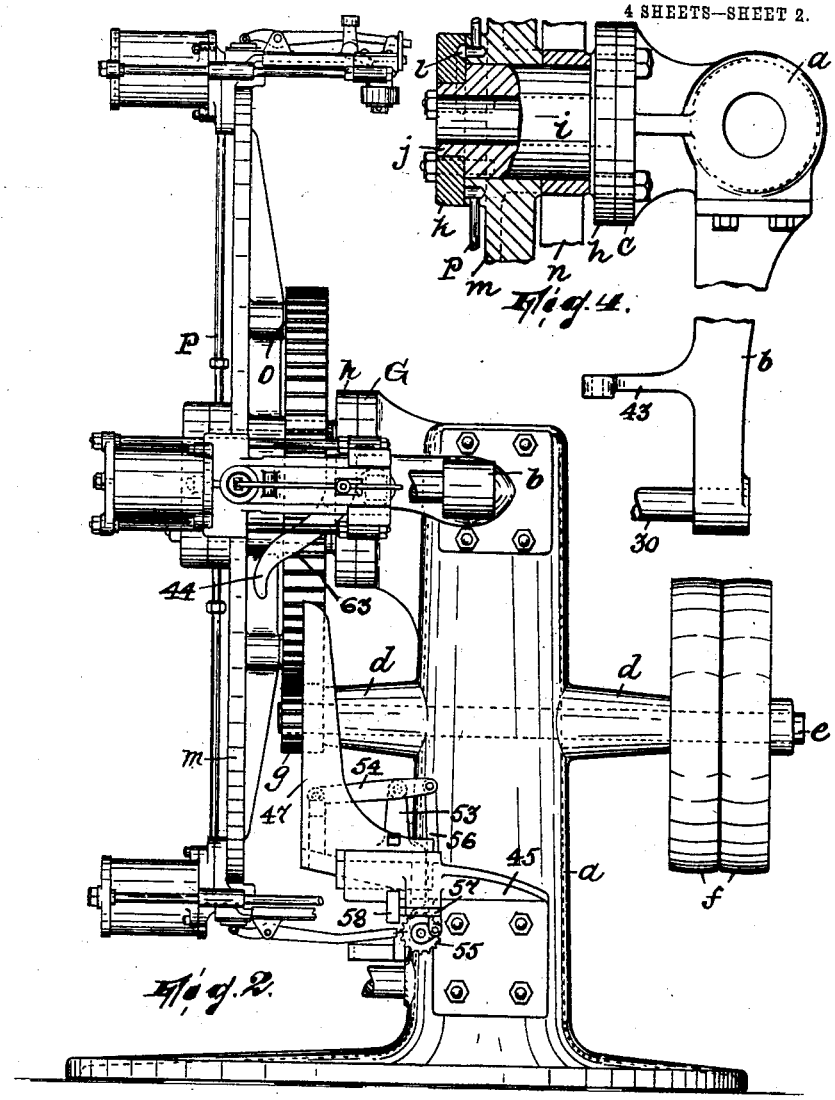
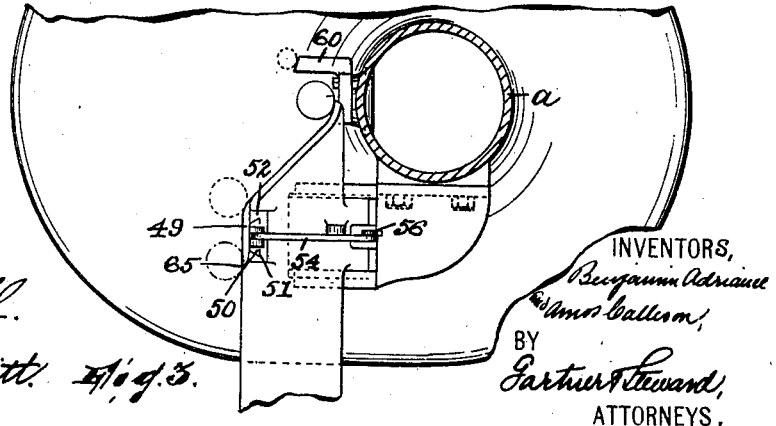
WITNESSES:
Wm D Bell
Robert J Pollitt
INVENTORS,
Benjamin Adriance
Amos Calleson
BY
Gartner & Steward,
ATTORNEYS.

No. 762,604. PATENTED JUNE 14, 1904.
B. ADRIANCE & A. CALLESON.
CAN TESTING MACHINE.
APPLICATION FILED AUG. 10, 1903.
NO MODEL. 4 SHEETS—SHEET 3.
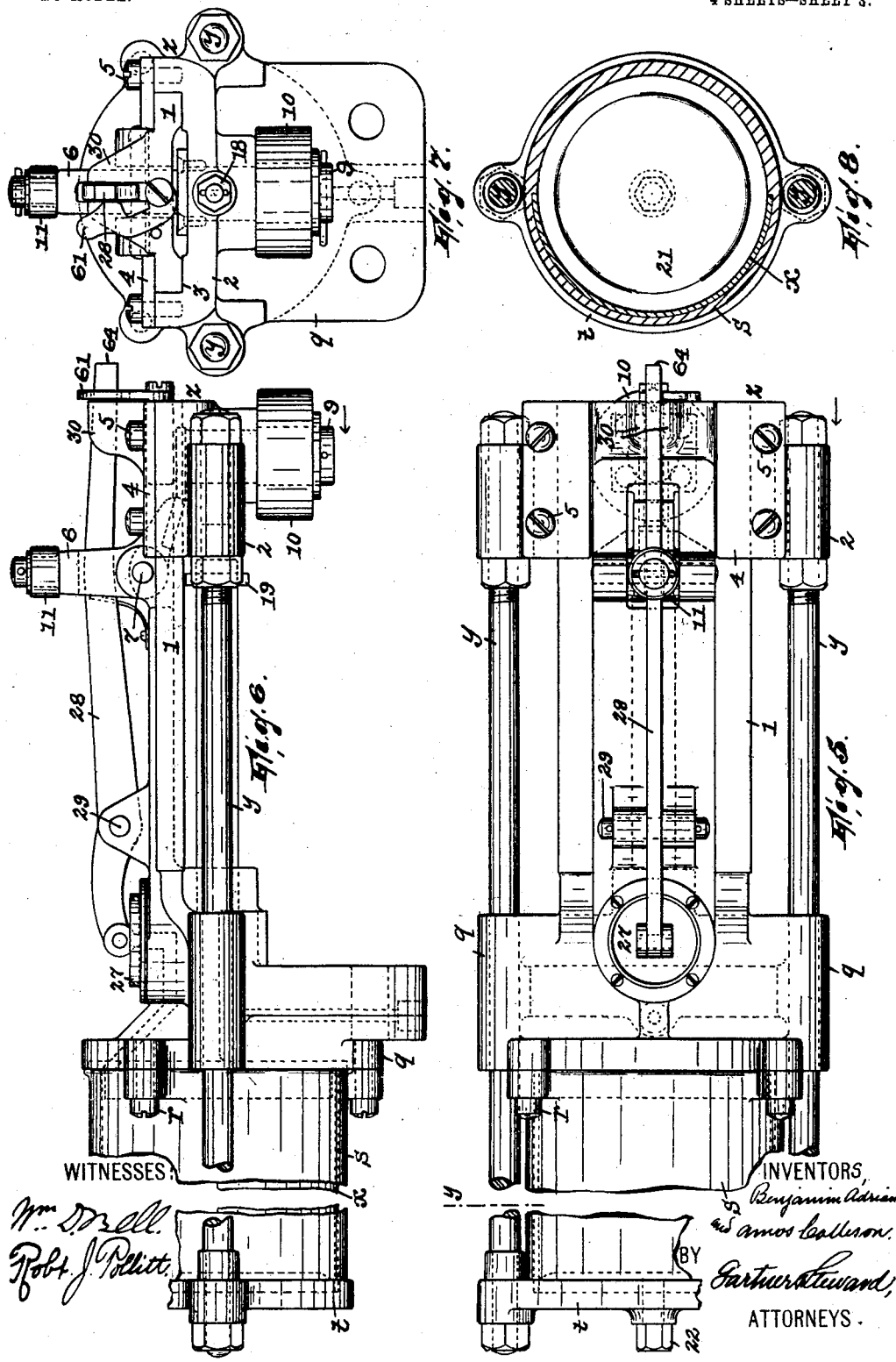

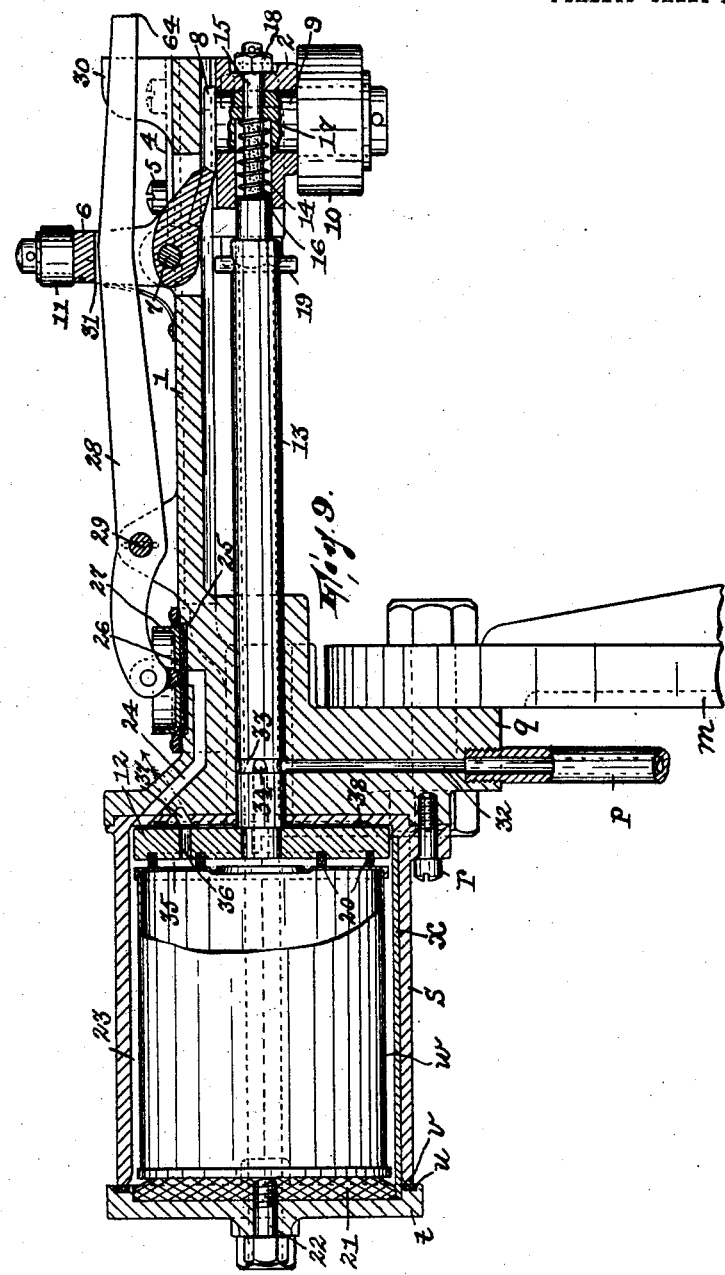

No. 762,604.

Patented June 14, 1904.

UNITED STATES PATENT OFFICE.

BENJAMIN ADRIANCE AND AMOS CALLESON, OF NEW YORK, N. Y.; SAID CALLESON ASSIGNOR TO SAID ADRIANCE.

CAN-TESTING MACHINE.

SPECIFICATION forming part of Letters Patent No. 762,604, dated June 14, 1904.

Application filed August 10, 1903. Serial No. 168,900. (No model.)

*To all whom it may concern:*

Be it known that we, BENJAMIN ADRIANCE and AMOS CALLESON, citizens of the United States, residing in the borough of Brooklyn, city of New York, county of Kings, and State of New York, have invented certain new and useful Improvements in Can-Testing Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to means for automatically testing sheet-metal cans with the object of detecting leak-openings therein, and it has reference particularly to that class of can-testing machinery wherein the detecting of leaks is effected by a fluid acting to destroy the equilibrium between the pressures inside and outside the can, the condition of the walls of the can—*i. e.*, as to their ability to resist a tendency toward equalization of pressures—being depended upon to determine how certain mechanical devices shall act in order to properly perform the function of dividing the good and bad cans into separate lots.

The invention will be found fully illustrated in the accompanying drawings, wherein—

Figure 1 is a view in front elevation of a machine constructed after the principles of said invention. Fig. 2 is a side view of said machine. Fig. 3 is a horizontal sectional view of the machine, taken immediately above a certain lever 54. Fig. 4 is a fragmentary view of the machine, partly in elevation and partly in section. Fig. 5 is a top plan view of so much of the mechanism as is directly adjacent any particular can while being operated upon. Fig. 6 is a side view of what is seen in Fig. 5. Fig. 7 is a view of what is seen in Figs. 5 and 6 as it appears when viewed in the direction of the arrows in said figures. Fig. 8 is a transverse sectional view of what is shown in Figs. 5, 6, and 7 on the line $y$ in Fig. 5; and Fig. 9 is a longitudinal and central sectional view of what is shown in Figs. 5, 6, and 7.

$a$ is a pedestal carrying bolted thereto near its top a laterally-extending arm $b$ and formed with an integral vertical face-plate $c$. At $d\ d$ is journaled in said pedestal a drive-shaft $e$, carrying fast and loose pulleys $f$ at one end and a pinion $g$ at the other end. To the face-plate $c$ is bolted a disk $h$, formed at one end of a hollow stub-shaft $i$, onto the reduced end $j$ of which is bolted a disk $k$, having in its inner face an annular concentric channel $l$ of parti-circular form. Between disks $h$ and $k$ are journaled a circular carrier $m$ and a gear $n$, which are locked together by bolts or otherwise, as at $o$, and the latter of which intermeshes with pinion $g$. The carrier is formed with radial ducts $p$, whose inner ends are adapted to communicate with the annular channel $l$ of disk $k$.

Secured at or near the peripheral portion of the carrier $m$ is a series of organisms, of which one is specially illustrated in Figs. 5 to 9, inclusive, and which are now to be described.

$q$ is a casting or frame bolted to the carrier in parallelism to its axis of rotation. To this frame is secured, as by screws $r$, a cylindrical chamber $s$, open at its outer end and having its longitudinal axis also parallel with the axis of rotation of carrier $m$. This cylindrical chamber is adapted to coact with its head $t$, which has a yielding packing $u$ arranged to seat against the edge $v$ at the open end of the chamber to form a hermetically-sealed holder for a can $w$ while undergoing the test. The head $t$ forms the flat or end wall of a scoop adapted to convey the can into and out of chamber $s$, the curved wall $x$, Fig. 8, of said scoop being semicylindrical, or substantially so. Said scoop is bolted to the front ends of slide-rods $y$, guided in the frame $q$, one at each side thereof, the rear ends of said slide-rods being secured to a carriage $z$, which slides on a rearward extension 1 of frame $q$, forming a guideway for said carriage. The carriage comprises a casting 2, formed with a groove 3, fitting the guideway, and plates 4, secured to the casting by screws 5 and overlapping the guideway, Figs. 5, 6, and 7. Upon moving the carriage in the direction of the chamber $s$ it will be seen that the scoop will be thrust out of the chamber and the latter opened. The chamber is kept positively closed by a spring-actuated pawl 6, pivoted at 7 in the extension or guideway 1 and having one end adapted to engage a head 8, forming a stop on a stud 9, which is carried radially in the carriage relatively to the carrier $m$ and forms a bearing for an antifriction-roller 10, the other end of said pawl carrying an antifriction-roller 11, whose function will be hereinafter explained.

In the chamber is disposed a plunger 12, whose spindle 13 slides in the frame or casting $q$ and has its rear end arranged in the carriage above referred to. A spring 14, coiled about a reduced portion 15 on said spindle and taking between a shoulder 16 on the spindle and the end of a bore 17 in the carriage, tends to move the plunger in the carriage toward the open end of the chamber $s$, such movement being, however, limited by a nut 18, which is screwed upon the extremity of the spindle made to protrude through the carriage.

19 is a stop-pin carried by the spindle 13 and adapted to impinge against the back of frame $q$ when the plunger is pressed forward. The carriage being moved in the direction of the chamber $s$, it will be seen that it will not only thrust forward the scoop to open the chamber, but will also move forward the plunger, which latter during this movement maintains a constant distance from the head $t$ until the stop 19 impinges against casting $q$, whereupon the plunger will cease to move, although the head will continue to move a little farther.

The outer face of the plunger 12 carries two concentric elastic rings 20, against which the head of the can having the opening is adapted to take, and the inner face of the head $t$ carries an elastic seat 21, secured thereto by a screw or other means 22, against which the bottom head of the can seats. When the chamber is closed, the can is pressed against the elastic rings 20, so that an enveloping space 23 is formed around the can entirely cut off from the interior of the can. This space 23 communicates by a port 24 with a chamber 25, formed in the frame or casting $q$ and covered by a diaphragm 26, on which rests a piston 27, pivotally carried by one end of a lever 28, fulcrumed in the frame $q$ at 29 and guided between lugs 30 on the rear end of frame $q$, incidentally penetrating an opening 31 in pawl 6 in such manner that neither of these parts interferes with the action of the other.

Duct $p$ is in the form of a pipe which enters the frame $q$ in coincidence with a port 32, in turn coinciding with an annular port 33, formed in the spindle 13, said annular port in turn communicating with another right-angular port 34, which discharges into the chamber $s$. Thus whenever duct $p$ coincides with channel $l$ of disk $k$ the air which is fed to the machine through an opening 33′, communicating with said channel, will pass through said duct-ports 32, 33, and 34, and, the chamber being closed, into the can contained therein. If the can is a leaky one, the pressure, acting through space 23, port 24, and chamber 25, will actuate the diaphragm 26 and piston 27 to move lever 28.

The annular space 35, which exists between rings 20, communicates with the atmosphere through a port 36 in the plunger, registering when the plunger is back at it farthest limit in the chamber with a duct 37, penetrating the back of the chamber and frame $q$. Thus should a can have a top head dented or otherwise misshapen sufficiently to afford passage for the air past the inner ring $q$ the air can escape, so as not to tend to effect the undesired equalization of pressures inside and outside the can while the latter is undergoing the test.

38 is an elastic ring arranged in the closed end of the chamber $s$, where when impinged by the plunger it will prevent the air which may escape past the inner ring 20 from having ultimate access to the chamber 25.

The arm $b$ carries a supporting structure 39 for an inclined supply-chute 40 and inclined discharge-chutes 41 42 for the bad and good cans, respectively. Chute 40 inclines downwardly toward the machine and is arranged between the vertical planes between which the scoops stand when they are in their extreme outermost positions out of the chambers $s$. An extension 43 of the arm $b$ carries a cam 44, so arranged that, the chambers $s$ being open, each roller 10 will engage and ride up on the same to cause the carriage to act, through the slide-rods $y$, to draw the scoop containing the can into the chamber $s$ to be thereupon held, so as to maintain the chamber closed, by the pawl 6.

The supply-chute is relatively close to the two discharge-chutes, so that the cans are subjected to the test through a very considerable portion of any cycle of rotation of the carrier $m$.

The mechanism now to be described effects the discharge of the cans from the machine after being tested. In a bracket 45, secured to the pedestal, is formed a dovetailed slot 46, in which is arranged so as to be adjustable in a direction parallel with the axis of the carrier $m$ a cam 47, secured by a set-screw 48. At the beginning of its highest elevation a section 49 of this cam is made movable radially of the carrier $m$, said movable section being formed with a dovetailed guide 50, arranged in a corresponding slot 51, formed in a radial projection 52 of the cam. A radial stud 53 on the cam 47 forms a fulcrum for a lever 54, one of whose ends is pivotally connected with the guide 50, while its other end is connected with an eccentric point on a pinion 55, journaled in bracket 45 through the medium of a link 56. A rack 57, guided horizontally in the bracket 45, meshes with the pinion 55 and has its head 58 formed with an outer curved face 59, so arranged that if one of the levers 28 has been actuated to relatively depress its free end said end will take against the curved face of head 58 and push the rack inwardly, turning pinion 55 and through link 56 and lever 54 elevating the cam-section 49 so that it breaks the continuity of the acting face of cam 47 at the beginning of its highest level. As soon as the depressed lever 28 passes out of engagement with head 58 the action of gravity on parts 49 50 and the longer end of lever 54 will return the pinion and rack and the head of the latter to their normal positions.

Cam 47, it should be understood, is designed to be engaged by each roller as the same approaches, so as to open its corresponding chamber $s$ ready to discharge the can, and it being borne in mind that each pawl 6 has been acting as the primary expedient for keeping each chamber $s$ closed in order that the carriage may be released from this pawl before roller 10 is acted on by cam 47 a stud 60 is arranged where it will engage roller 11 of pawl 6 and disengage the pawl from the carriage before roller 10 engages the cam 47.

Upon a view to Fig. 1 it will be seen that the air is cut off before the opening of any particular chamber, this because channel $l$ terminates short of the beginning or rise of cam 47. Therefore in order to prevent the action of gravity from returning any lever 28 to its initial position after it has been once moved by the air acting on diaphragm 26 during the interval where the air is cut off (at the termination of channel $l$) and where the cam 47 begins to act on the roller 10 to open chamber $s$ a latch 61 is provided, being pivoted to the end of the extension 1 of each casting or frame $q$, where the action of gravity will throw it over lever 28 to hold the latter down as soon as said latch passes the highest point in its rotation with the carrier $m$. 62 is a stud fixed to some suitable stationary part, as cam 47, so as to be in the path of the latch 61 to disengage it from the lever 28, and thus release the same after the necessity for longer holding it has passed.

Operation: As each chamber $s$ in the rotation of carrier $m$ approaches can-chute 40 its scoop takes off one of the cans, another rolling down in the chute to take its place. Roller 10 then takes against the face 63 of cam 44, so that the carriage is forced back and the scoop carrying the cam drawn into the chamber $s$ to be thereupon held, keeping the chamber closed, by the pawl 6. Duct $p$ thereupon begins to coincide with channel $l$, so that the air enters the can. If the can leaks, the air actuates lever 28 through diaphragm 26 and piston 27 to throw the longer arm of the lever inwardly. Subsequently the action of gravity throws pawl 61 into engagement with the lever to hold it in this position. If the can is a good one, the lever 28 will not be actuated, and by the time it begins to approach the point where the cans are to be discharged gravity will at least hold it in the position shown in Fig. 9. Assuming that the can is a leaky one, the longer arm of lever 28 being forced inwardly its extremity 64 will wipe against the face 59 of the head 58 of rack 57, so that the rack will be pushed inwardly, turning the pinion, and through the link 56 and lever 54 raise the section 49 of cam 47. Previous to this roller 11 engages stud 60 to disengage pawl 6, so that the scoop is free to move out of the chamber $s$ and the roller 10 has begun to ride up on the incline of cam 47. The cam-section 49 having been removed from the path of roller 10, the latter will only move the carriage far enough so as to open the chamber, but not far enough to force pin 19 against frame $q$, and thereupon by compressing spring 16 effect an increase in the space between plunger 12 and disk 21. Spring 16 will therefore maintain the can clamped between the plunger and the disk, so that the can will not be discharged into chute 42. Instead the can will proceed, held clamped between the plunger and the disk, until it comes opposite chute 41, whereupon roller 10 will ascend to the full height of the acting face of cam 47, as at 65, thereby forcing disk 21 away from plunger 12, and so releasing the can, which will then fall into chute 41 as a bad can. Cam-section 49 and the parts controlling the same will thereupon reset themselves in the manner already described, and later latch 61 will be engaged by stud 62 to release lever 28. The can being a good one and lever 28 therefore remaining in the position shown in Fig. 6 throughout one full revolution of carrier $m$, the rack 57 will not be actuated therefrom, and so cam-section 49 will remain to keep intact the acting face of cam 47, so that immediately on roller 10 leaving the incline of said cam (pawl 6 having been actuated by stud 60 to release the carriage) the carriage will not only be pushed back to bring the can full out of the chamber, but to effect the spacing of plunger 12 and disk 21, which effects the release of the cam. The can will then fall into chute 42 as a good can.

The machine can be adjusted to accommodate various lengths of cans by changing the disk 21 for one of different thickness, if the change in the length of the can is not very considerable, and adjusting the cam 47 in the bracket 45. If the length of the can to be operated upon is changed, it will be understood that a corresponding change in the length of thrust of the parts in either bringing the can into the chamber or discharging it therefrom must be effected.

It will be observed that so long as the can is interposed between the plunger 12 and the seat 21 and spring 14 is not compressed the can is secured fast whether it stands within or outside of the chamber *s*. The means thus acting to hold the can is destined up to a certain point in each cycle of operation to retain its hold without danger of interruption. After that point is passed means is approached whose function it is to cause the holding means to release the can, (in the adaptation shown the cam-section 49.) Leaving out of consideration what operates on the holding means after it passes the means (cam-section 49) last referred to the latter will be seen to be controlled so as to cause or not cause the release of the can by mechanism dependent for its actuation upon the condition of the can—*i. e.*, whether or not it is able to resist the tendency of the pressures inside and outside the can to equalize themselves. Broadly, this is not new; but we are not cognizant of any previously-conceived organization in which the means referred to is normally disposed to effect the release of the can, but is rendered impotent for this result should the can prove to be defective; nor are we even aware of any organization in which said means being normally disposed to effect the release of the can is rendered impotent for this result by mechanism dependent for its actuation upon the pressure conditions, broadly, at the can.

Having thus fully described our invention, what we claim as new, and desire to secure by Letters Patent, is—

1. The combination of a can-holding means, means for submitting the can to be tested to a compressed-fluid test, other means for causing the holding means to release the can, and automatic means for rendering said other means inoperative to effect the release of the can if the can is a leaky one, substantially as described.

2. The combination of a can-holding means, means for submitting the can to be tested to a compressed-fluid test, other means for causing the holding means to release the can, and means, actuative from the fluid escaping through the can, for rendering said other means inoperative to effect the release of the can if the can is a leaky one, substantially as described.

3. The combination of a can-holding means, means for submitting the can to be tested to a compressed-fluid test, other means, engageable with the holding means, for causing the same to release the can, and means, actuative from the fluid escaping through the can, for preventing the engagement of said holding means and said other means so as to postpone the release of the can, substantially as described.

4. The combination of a movable can-holding means, means for submitting the can to be tested to a compressed-fluid test, a cam member, engageable with the holding means, for causing the same to release the can, and means, dependent upon the ability of the can to resist the fluid-flow therethrough and actuative from the fluid, for moving said cam member out of contacting engagement with the holding means so as to postpone the release of the can, substantially as described.

5. The combination of a movable can-holding means, means for submitting the can to be tested to a compressed-fluid test, a cam having a part of its acting portion movable, said cam being engageable with the holding means so as to cause the latter to release the can, and means, dependent upon the ability of the can to resist the fluid-flow therethrough and actuative from the fluid, for moving said movable part of the cam out of contacting engagement with the holding means so as to postpone the release of the can, substantially as described.

6. The combination of two structures of which one is movable past the other and one of which comprises a can-holding means, means for submitting the can to be tested to a compressed-fluid test, said holding means being engageable with the other structure to effect its release and said other structure being movable into and out of operative position for permitting such engagement, and means, dependent upon the ability of the can to resist the fluid-flow therethrough and actuative from the fluid, for controlling the movement of said other structure, substantially as described.

7. The combination of a relatively fixed structure, a carrier movable past the same, a can-holding means movable with the carrier, means for submitting the can to be tested to a compressed-fluid test, said fixed structure comprising a movable part engageable with the holding means to release the same, and means, dependent upon the ability of the can to resist the fluid-flow therethrough and actuative from the fluid, for moving said part into and out of the operative position where said holding means can engage said part, substantially as described.

8. The combination of a hollow structure comprising a closured can-receiving chamber, means for directing a fluid through said structure into testing contact with the can, and means, located on the side of the walls of the can opposite to that against which the pressure comes and actuative from the fluid escaping through said can-walls, for indicating the result of the test, substantially as described.

9. The combination of a hollow structure comprising a closured can-receiving chamber, a can-holding means, means, in said structure and adapted to coact with the can being tested, to seal off a part of the space of said structure from the remainder thereof, means for directing a fluid through said structure into testing contact with the can, and means, dependent upon the ability of the can to resist the fluid-flow therethrough and actuative from the fluid, for causing the holding means to release the can, substantially as described.

10. The combination of a hollow structure comprising a closured can-receiving chamber, a can-holding means, means, in said structure and adapted to coact with the can being tested, to seal off a part of the space of said structure from the remainder thereof, means for directing a fluid through said structure into testing contact with the can, means, dependent upon the ability of the can to resist the fluid-flow therethrough and actuative from the fluid, for causing the holding means to release the can, and means for operating the closure of said chamber, substantially as described.

11. The combination of a can-clamping means, means for projecting a fluid under pressure against one surface of the walls of said can to test the latter, other means for causing the clamping means to release the can, a fluid-conduit leading from opposite the other surface of the can in the region to be tested, and means for rendering said other means inoperative to effect the release of the can from the clamp comprising a part actuative from the fluid escaping into said conduit, substantially as described.

12. The combination of a tubular structure comprising a can-clamping means and a testing-chamber having means for hermetically closing the same, means for projecting a fluid under pressure into the can, and means for controlling the release of the can from the clamp and comprising a part actuative from the fluid escaping from the can into the tubular structure, substantially as described.

13. The combination of a can-carrier, means for causing said carrier to release the can, means for subjecting the can to a compressed-fluid test, and means, dependent upon the pressure conditions at the can, for rendering said first-named means impotent to effect the release of the can from the carrier, substantially as described.

In testimony that we claim the foregoing we have hereunto set our hands this 28th day of July, 1903.

BENJAMIN ADRIANCE.
AMOS CALLESON.

Witnesses:
JOHN W. STEWARD,
WM. D. BELL.